US012718842B1

(12) United States Patent
Wernow et al.

(10) Patent No.: US 12,718,842 B1
(45) Date of Patent: Aug. 25, 2026

(54) EARLY WARNING OFFTRACK COLLISION SYSTEM FOR HARD DISK DRIVES

(71) Applicant: Seagate Technology LLC, Fremont, CA (US)

(72) Inventors: Josiah Natan Wernow, San Diego, CA (US); Joshua Ward Christensen, Savage, MN (US); Brian Thomas Edgar, Minneapolis, MN (US)

(73) Assignee: Seagate Technology LLC, Fremont, CA (US)

(*) Notice: Subject to any disclaimer, the term of this patent is extended or adjusted under 35 U.S.C. 154(b) by 0 days.

(21) Appl. No.: 19/088,040

(22) Filed: Mar. 24, 2025

(51) Int. Cl.
*G11B 5/596* (2006.01)

(52) U.S. Cl.
CPC ................................ *G11B 5/59627* (2013.01)

(58) Field of Classification Search
None
See application file for complete search history.

(56) References Cited

U.S. PATENT DOCUMENTS 6,496,315 B1 * 12/2002 Ueda .................. G11B 5/59627 360/78.01
6,628,471 B1 * 9/2003 Min ................... G11B 5/59633 360/77.02
6,975,468 B1 12/2005 Melrose et al.
8,854,751 B2 10/2014 Rub
9,236,087 B1 1/2016 Dahlberg
9,304,930 B2 4/2016 Shu et al.
9,437,240 B1 9/2016 Haddock
9,495,988 B1 11/2016 Liu et al.
9,607,633 B1 * 3/2017 Toribio ................ G11B 20/182
11,164,598 B1 11/2021 Kashyap et al.
11,462,245 B1 10/2022 Sosseh et al.
2002/0059276 A1 * 5/2002 Wei Loon ............ H04N 21/232
2003/0030928 A1 * 2/2003 Tang ...................... G11B 27/36 360/75
2003/0184909 A1 * 10/2003 Zhang ................ G11B 5/59627 360/77.04
2015/0269081 A1 * 9/2015 Shu ....................... G06F 3/0619 369/53.42

* cited by examiner

*Primary Examiner* — Peter Vincent Agustin
(74) *Attorney, Agent, or Firm* — Mueting Raasch Group

(57) ABSTRACT

Described are systems and methods during writing of data in hard disk drives in which adjacent track squeeze events are predicted by looking at the difference in position error signal (PES) between two tracks, one PES being a recorded value for data already written, and the other being a predicted value for an upcoming write. This approach recognizes that only using the PES of the track currently being written may not be a reliable indicator of sector failure, particularly in environments susceptible to vibration. This can reducing the unrecoverable error rate while maintaining in-system performance by stopping high-risk writes before they occur and by preventing unnecessary write fault flags.

20 Claims, 6 Drawing Sheets

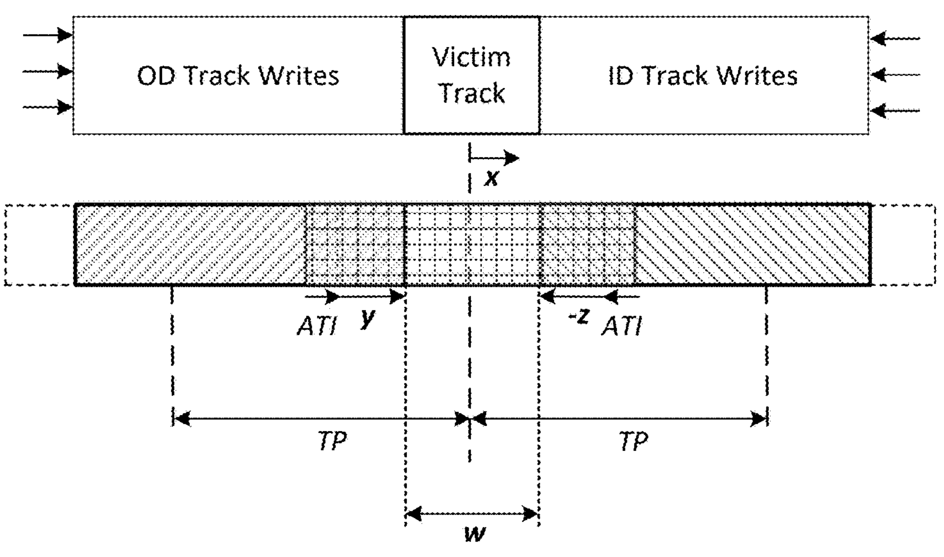
FIG. 3
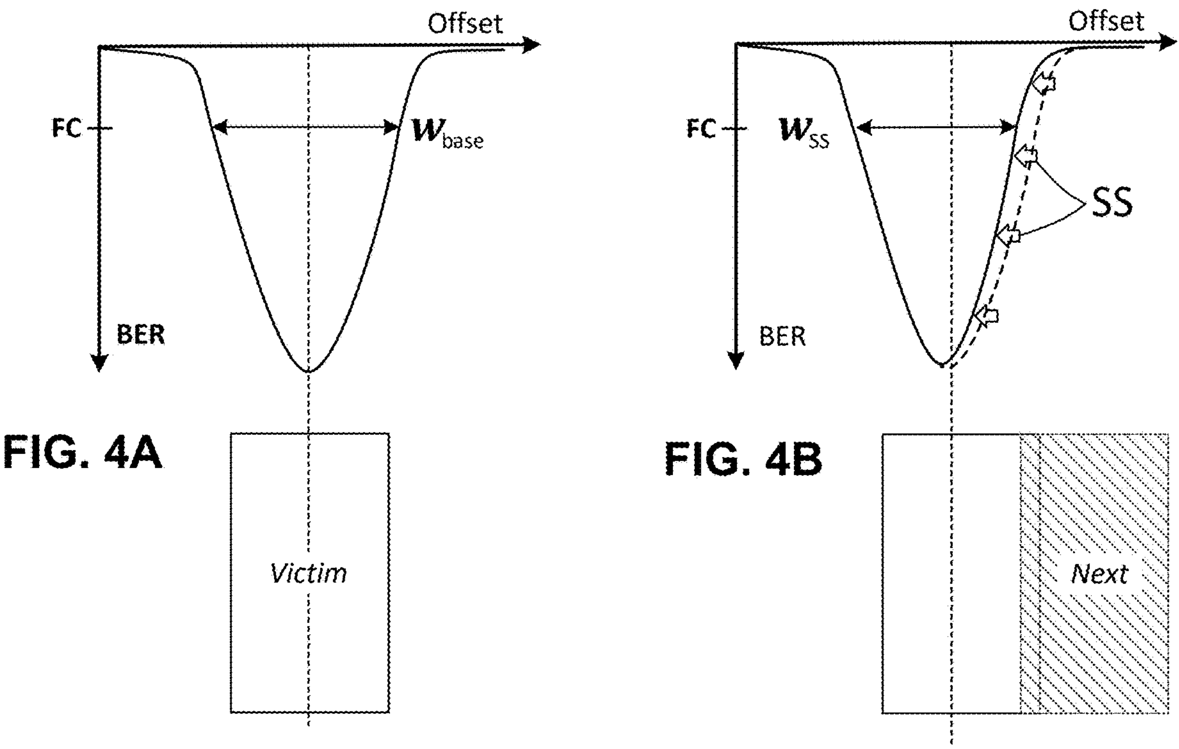
FIG. 4A
FIG. 4B

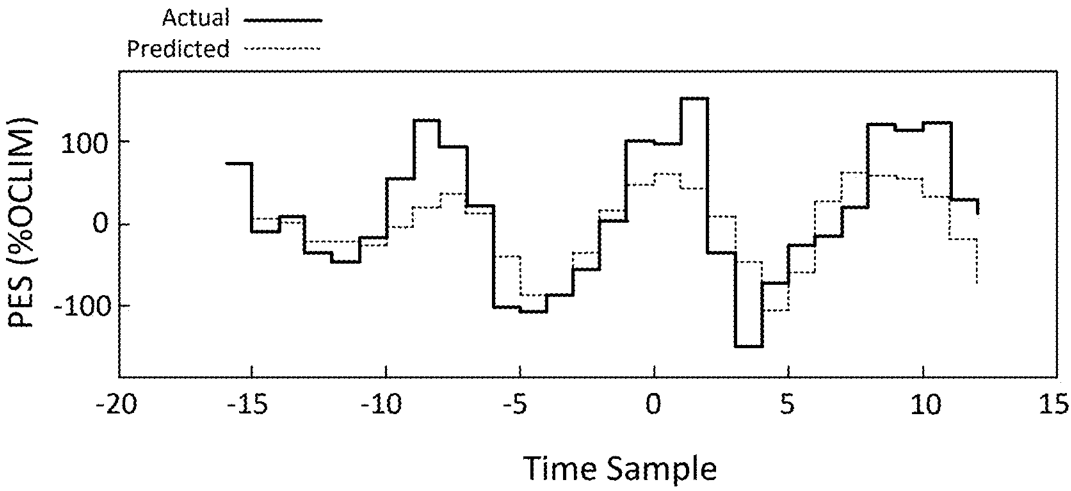
FIG. 5
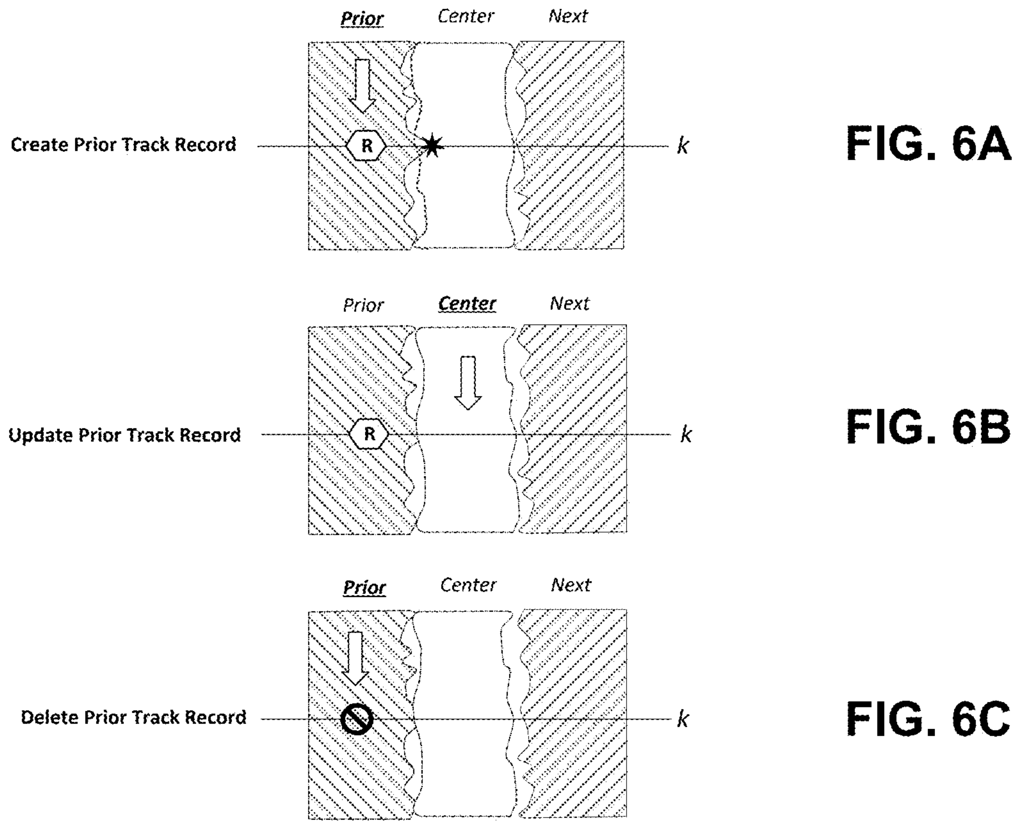
FIG. 6A
FIG. 6B
FIG. 6C

Create Prior Track Record
Prior
Center
Next
R
k

No Update to Prior Track Record
Prior
Center
Next
R
k

Update Prior Track Record
Prior
Center
Next
R
k

EARLY WARNING OFFTRACK COLLISION SYSTEM FOR HARD DISK DRIVES

The disclosure relates to the operation of hard disk drives, and in particular to determining the presence of potential fault events during writing.

SUMMARY

In accordance with certain aspects, the present disclosure describes methods of use in a hard disk drive. Such methods include measuring and recording a first position error signal that exceeds a squeeze threshold set for detecting adjacent track squeeze events, where the first position error signal is associated with a first sector on a first track. Such methods further include, while writing data at a second sector on a second track adjacent to the first sector on the first track, generating a predicted position error signal for a next sector on the second track, and then comparing a difference between the predicted position error signal and the first position error signal to a squeeze limit. When the difference is not greater than the squeeze limit, the next sector on the second track may be written. Otherwise, a squeeze event flag may be set that prevents writing the next sector until the squeeze event flag is cleared.

In accordance with certain aspects, the methods may include generating the predicted position error signal by measuring a current position error signal and using the current position error signal as the predicted position error signal, by using a previously measured position error signal as the predicted position error signal, or by using Kalman filtering.

In accordance with certain aspects, the methods may include preventing data writes when a current position error signal exceeds an on-cylinder limit, the on-cylinder limit being greater than the squeeze threshold.

In accordance with certain aspects, the methods may include determining a velocity of the first position error signal, and using the velocity in generating the predicted position error signal.

In accordance with certain aspects, the methods may include, for any position error signal that exceeds the squeeze threshold, determining whether that position error signal is associated with a single-sided squeeze event or a double-sided squeeze event.

In accordance with certain aspects, the present disclosure describes methods of use in a hard disk drive. In accordance with such methods, for any recorded position error signal that exceeds a squeeze threshold for adjacent track squeeze events, the recorded position error signal being associated with a first sector on a first track, a predicted position error signal is generated during writing data to a current sector on a second track adjacent to the first track, the current sector being adjacent to the first sector. The methods further include determining that the difference between the predicted position error signal and the recorded position error signal exceeds a squeeze limit, and preventing writing of the data.

In accordance with certain aspects, the methods may include retrying writing the data after a full revolution of the spinning magnetic disk.

In accordance with certain aspects, the present disclosure describes hard disk drives that include a recording head configured to write data in data tracks on a spinning magnetic recording disk, and controller electronics coupled to the recording head for controlling writing data, where the controller electronics are configured to implement any of the described methods The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF THE DRAWINGS

FIG. 3 is an illustration of effective track width in the presence of intertrack interference.

FIGS. 4A-4D schematically illustrates the intertrack interference effects of squeeze and vibe from adjacent tracks encroaching on a victim track.

FIG. 5 is a plot of actual versus predicted position error signal (PES) over time for a number of data samples.

FIGS. 6A-C schematically show a sequence in which an adjacent track squeeze event is recorded, checked, and deleted in accordance with aspects of the present disclosure.

DETAILED DESCRIPTION

Figure 1:
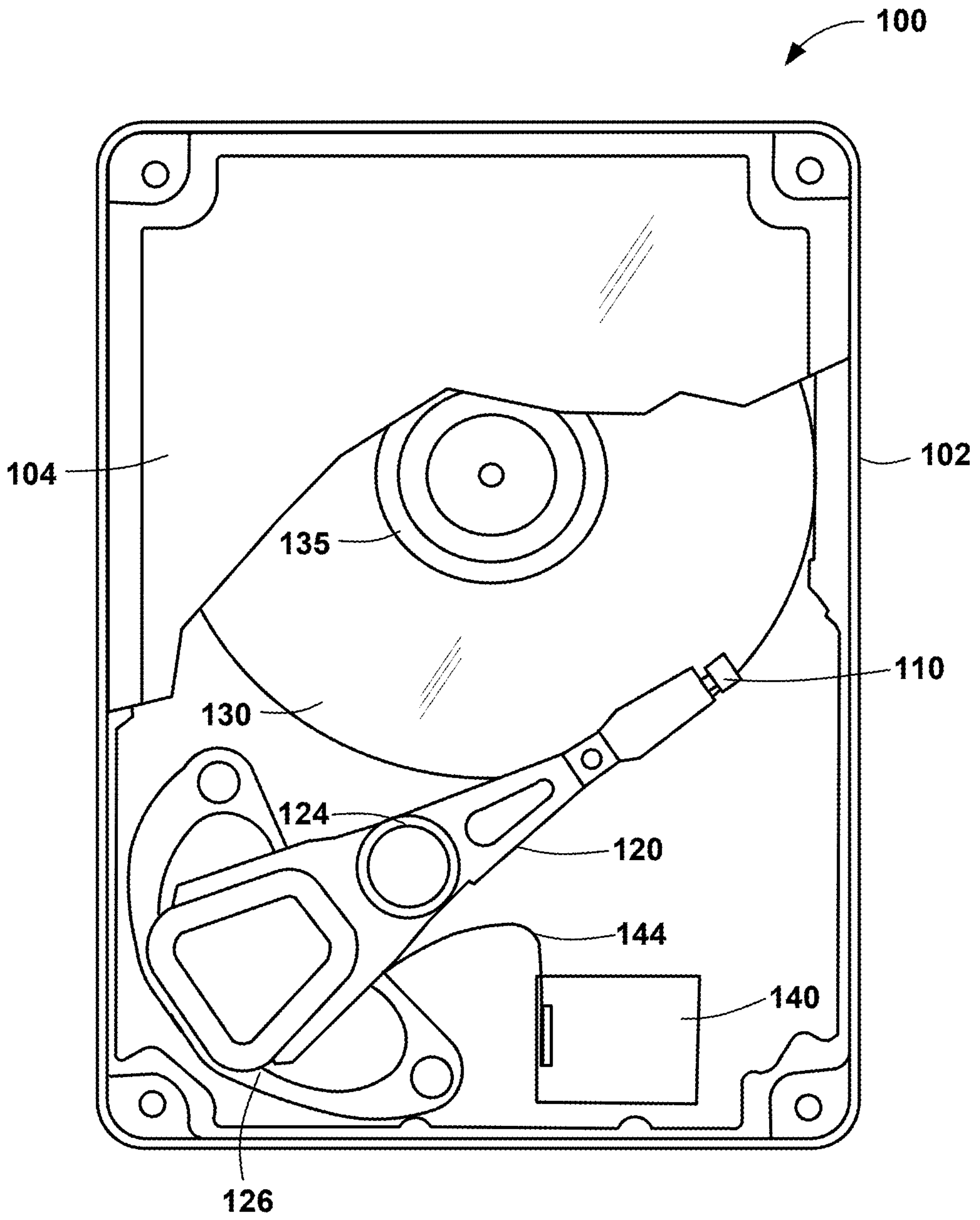
FIG. 1 is a schematic representation of a hard disk drive that may be utilized in accordance with aspects of the present disclosure.

The present disclosure relates to detecting and preventing high-risk data writes in a hard disk drive (HDD) in a manner that mitigates against degraded performance, particularly as storage densities increase. This can be accomplished by predicting potential track squeeze events, for example caused or exacerbated by vibration events (vibe), and incorporating such predictions into data tracking processes. Potential track squeeze events can be predicted by comparing a measured and recorded position error signal (PES) to a predicted PES for an upcoming sector to be written. Prediction of PES can be done using Kalman prediction or other prediction techniques. When the difference between the measured PES and the predicted PES is greater than a specified limit, then writing the upcoming sector is considered to be a high-risk data write, which can be mitigated. Mitigation may involve skipping the write and waiting for another revolution of the media disk to try again.

In certain current HDDs, the servo fault system is based on a determined limit, known as the on-cylinder limit (OCLIM), which prevents writes when the absolute value of the PES is outside of the OCLIM. In accordance with the present disclosure, it is recognized that, as data density increases, reliance on OCLIM may result in reduced performance of the hard disk drive due to an increase in data write prevention events that require spinning the media disk for an additional revolution, and particularly when many of such events may have been unnecessary. In essence, applying OCLIM everywhere on all tracks is like narrowing a road by placing construction cones along its whole length even though construction is only taking place in a few isolated locations. Systems and methods of the present disclosure may be used to maintain in-system performance by using predictive techniques to more selectively determine where potential high-risk writes may occur. While maintaining in-system performance (for example, an in-system performance that is about 95% or more of a nominal in-system performance at the same OCLIM), the sector failure rate due to high track squeeze events can be reduced, particularly in environments susceptible to high vibration.

In accordance with various aspects, the present disclosure provides for reducing the unrecoverable error rate (UER) in HDDs by stopping high-risk writes before they occur. This may involve recording the PES during writing whenever the PES exceeds a specified threshold, $\tau$. In cases where OCLIM is used, $\tau$ is less than OCLIM. A Kalman predictor or similar prediction technique may then be used to predict the PES for an upcoming write event. In certain aspects, it may be determined whether to apply single-sided or double-sided erasure criteria, depending on whether the track being written may be encroached from an adjacent track on just one side or from the adjacent tracks on both sides. The threshold, $\tau$, is applied to the difference in PES between the predicted PES for the upcoming write and the PES recorded on the adjacent track that was last written. When $\tau$ is exceeded, an intermediate level servo unsafe alert can be issued to stop the current write.

Accordingly, the present disclosure relates to predicting adjacent track squeeze events by looking at the difference in PES between two adjacent tracks, one PES being a recorded value for data already written, and the other being a predicted value for an upcoming write. This approach recognizes that using only the PES of the track currently being written may not be a reliable indicator of sector failure, particularly in environments susceptible to vibration.

Reference will now be made to the drawings, which depict one or more aspects described in this disclosure. However, it will be understood that other aspects not depicted in the drawings fall within the scope of this disclosure. Like numbers used in the figures refer to like components, steps, and the like. However, it will be understood that the use of a reference character to refer to an element in a given figure is not intended to limit the element in another figure labeled with the same reference character. In addition, the use of different reference characters to refer to elements in different figures is not intended to indicate that the differently referenced elements cannot be the same or similar. It will also be appreciated that the drawings are meant to illustrate certain aspects and arrangements of features in a way that contributes to their understanding and are not meant to be scale drawings that accurately represent size or shape of elements.

FIG. 1 schematically depicts a typical hard disk drive (HDD) device 100 that includes a recording head 110 disposed on the end of an actuator arm 120 that is rotationally movable around a pivot 124, for example by use of a voice coil motor (VCM) 126. The recording head 110 is positioned in close proximity to the surface of magnetic media disk 130 such that the recording head 110 can write data to and read data from tracks on the magnetic media 130 as the media spins by action of a spindle motor 135. In many HDDs, the magnetic media 130 is provided as a stack of disks having recording surfaces that are accessed by recording heads provided on the ends of stacked actuator arms, the actuator arms being interleaved between the disks. For simplicity, FIG. 1 illustrates a single disk 130, actuator arm 120, and recording head 110.

Electronics for conditioning signals to and from the recording head 110 may be included on or close to the recording head 110. Such signal-conditioning electronics (not shown) may include preamp circuitry and read channel circuitry. Controller electronics 140 may be connected to VCM 126 and recording head 110 via a flex cable 144 that connects to traces on the actuator arm 120. Controller electronics 140 may also control the spinning of the media disk 130. While the actuator 120 is shown to move rotationally, the present disclosure is not limited to how the actuator moves and encompasses linear actuation. Likewise, recording head 110 can be provided on movable or stationary rails, or in any other suitable manner now known or later contemplated.

The internal components of HDD 100 are contained within an enclosure 102, including cover 104, which is shown partially cut away to reveal the internal components. The enclosure 102 may be sealed and filled with a desired atmosphere, such as helium gas, to create a controlled environment inside the HDD 100. A host device can communicate with conventional HDD 100 through a standardized interface (not shown). HDD 100 can operate on any magnetic recording principle, whether that be conventional magnetic recording (CMR), shingled magnetic recording (SMR), heat-assisted magnetic recording (HAMR), or any other type of recording technique, including combinations thereof.

A conventional servo subsystem of an HDD, like HDD 100 shown in FIG. 1, may utilize a write fault threshold, an on-cylinder limit (OCLIM), and/or other write tolerance thresholds to protect against corrupt data being written to the disk. When the write head of the HDD moves beyond these thresholds, as indicated by the PES of the servo subsystem, for example, a write fault signal may be issued blocking write operations so that a data write at an off-track position does not occur. Under conditions of relatively high vibration, the write fault signal may be triggered more frequently than under normal conditions, resulting in lower write throughput.

OCLIM may be defined as the distance off the track center that writing is allowed to occur. Each track has a center, and the write transducer is ideally flown over the center of that track during a write operation. OCLIM is like a guard-rail for the writer in that it prevents the writer from exceeding an allowable tolerance distance from the track center while writing data. However, OCLIM can be very costly for in-system performance. As such, in accordance with the present disclosure, it is recognized that, rather than relying on OCLIM in high vibration conditions, techniques may be employed to predict adjacent track squeeze that may be caused by vibration events. Such techniques involve determining the difference between a predicted PES for an upcoming write on a current track and a recorded PES for an adjacent track. These techniques may be implemented in the servo control system that implements OCLIM.

Figure 2A:
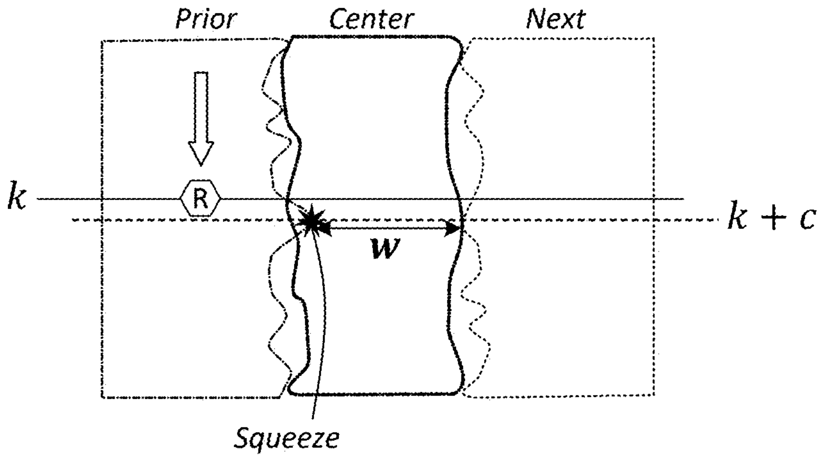
FIG. 2A is a schematic representation of adjacent data tracks and illustrating a potential offtrack collision event.

FIG. 2A schematically illustrates an adjacent track squeeze event (indicated by the star labeled "Squeeze"), which is presented in the context of various aspects of techniques of the present disclosure. As can be visualized, squeeze from adjacent tracks can reduce the effective track width w, leading to bit errors or unretrievable data, and thus high UER. In FIG. 2A, three adjacent data tracks are shown, designated Prior, Center, and Next. The tracks have exaggerated edges to indicate the presence of disturbances such as vibrations during writing. When writing on the Center track, any PES having an absolute value that is greater than a threshold, $\tau$, is recorded, where $\tau$ is set below OCLIM. In the case shown in FIG. 2A, the PES at sample time k is greater than $\tau$, and so the PES is recorded, denoted R.

Likewise, when writing on the track designated Next, any PES having an absolute value that is greater than a threshold $\tau$ is recorded.

When writing on the track designated Prior, the PES record(s), R, are retrieved for the Center track and for the Next track. Then, the inter-sample motion is predicted for the upcoming sector. In other words, the position error signal for the next sample, denoted PES(k+c), is predicted, where c is a time increment from one sample to the next. The difference in PES (denoted ΔPES) can then be calculated between the maximum predicted PES and either (1) the PES from writes on the victim track (in the case of single-sided squeeze), or (2) the PES from writes on the adjacent side tracks (in the case of double-sided squeeze). If ΔPES exceeds the specified limit, L, for single-sided squeeze or double-sided squeeze, as the case may be, then a write flag is set to "unsafe" and the media disk is spun one revolution before retrying the write.

Due to inter-sample motion, a velocity term, V(k), may also be accounted for. Essentially, the velocity is the slope and direction at which an adjacent track is encroaching on a victim track. If the velocity is toward the victim track, then the velocity term is included in the prediction. If this velocity is away from the victim track, then the velocity term is not included in the prediction. The inter-sample position at fractional time, c, is approximated as follows:

$$y(k+c)=y(k)+cV(k).$$

The value of c should be chosen based on the maximum expected frequency content for the target vibration environment (for example, 10 kHz). In certain aspects, in order to conserve memory, only PES values between OCLIM and t are stored, along with the corresponding sector, a track index value, and so forth. These values may be stored in a fast-access memory space so that PES information can be quickly accessed for neighboring tracks (in the single-sided erasure cases) and for the next tracks over (in the double-sided erasure cases).

Figure 2B:
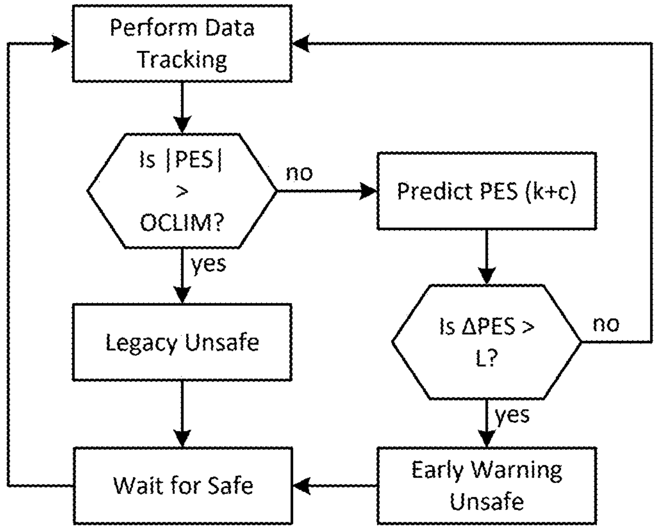
FIG. 2B is a flow chart of steps for detecting potential offtrack collision events in accordance with aspects of the present disclosure.

FIG. 2B is a high-level summary of a process for early warning of adjacent track squeeze events such as illustrated in FIG. 2A. Data tracking is performed during data writing to prevent write faults. In certain embodiments, OCLIM can continue to be used such that a measured PES that exceeds OCLIM is flagged as unsafe according to legacy processes. In such embodiments, OCLIM may be viewed as an outer guard rail. For any recorded PES events that exceeded a threshold $\tau$ below OCLIM at some sample k, a PES is predicted for an upcoming (subsequent) write, which is sample k+c. Then, a ΔPES can be calculated between the recorded PES and the predicted PES and compared to a limit, L. The calculation of ΔPES and the value of L may depend on whether the track squeeze event is a single-sided squeeze event (meaning that only one of the tracks adjacent to the victim track was written before the victim) or a double-sided squeeze event (meaning that both of the tracks adjacent to the victim track were written before the victim). If ΔPES exceeds L, then and early warning unsafe flag can be generated to prevent the write until the next media disk revolution. Moreover, after a warning unsafe flag has been generated, the track(s) responsible for halting the writing may be inspected to determine whether and the degree to which adjacent track squeeze or encroachment threatens writes so that appropriate action may be taken.

It will be appreciated that aspects of the present disclosure involve not only stopping writes based on predicted squeeze events, but also involve stopping writes based on actually detected squeeze events. For example, there may be instances when a squeeze event occurs when adjacent track squeeze or encroachment was not predicted. In these instances, even though ΔPES using the predicted PES may not have exceeded the threshold, ΔPES using the measured PES may exceed the threshold and a write fault may be indicated and acted upon in a manner similar to write fault methods utilizing OCLIM.

FIG. 3 illustrates various position errors, x, y, and z, that may be considered as track squeeze in accordance with aspects of the present disclosure. A Victim Track having a normalized track width, w, is shown in relation to track writes made on the outer diameter (OD) of the Victim Track, and in relation to track writes made on the inner diameter (ID) of the Victim Track. For reference, the nominal data track pitch, TP, is indicated. The position error x may be considered as the PES when the data is on the Victim Track. The position error y may be considered as the predicted PES for writes on the upcoming sector on the current track. The position error z may be considered as the PES of the opposite track of the Victim Track. In comparison to the track squeeze errors x, y, and z, adjacent track interference (ATI) refers to the portion of an adjacent track that is overwritten by the field of the current track write. The present disclosure is primarily directed to reducing the risk of track squeeze.

The illustration of FIG. 3 can be used to derive ΔPES for single-sided squeeze ($\Delta PES_{SS}$) and for double-sided squeeze ($\Delta PES_{DS}$). For single-sided squeeze, $\Delta PES_{SS}$ is simply the difference between the predicted position error and the position error on the victim track, which can be written as: $\Delta PES_{SS}=y-x$. For double-sided squeeze, $\Delta PES_{DS}$ is $(y-x)+(-z+x)$, which simplifies to $\Delta PES_{DS}=y-z$.

In summary of FIG. 3, in order to determine the risk of adjacent track squeeze and identify potential high-risk writes ahead of time, various aspects of the present disclosure may use the following information: a recorded value of the PES when data was written; a predicted PES for the upcoming sector on the current track; a PES for the track on the opposite side of the victim track from the current track; and whether the opposite track was written before or after the victim track. This last point is important in deciding whether to consider single-sided or double-sided squeeze.

Figure 4C:
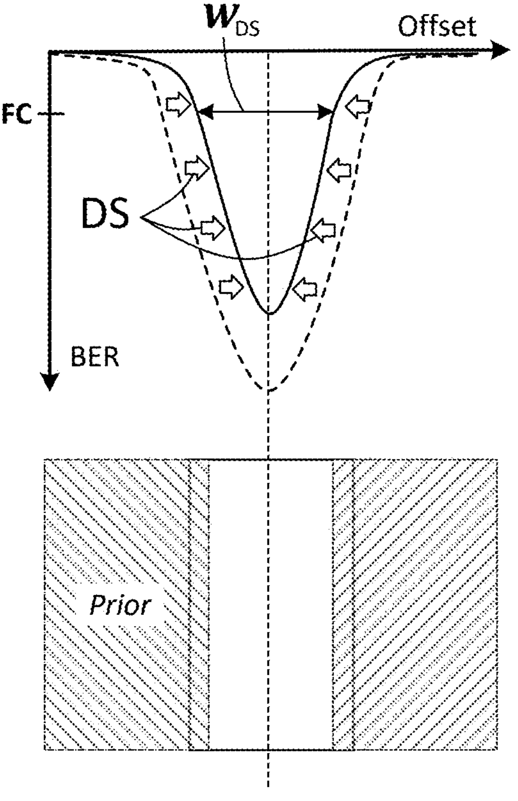
Figure 4D:
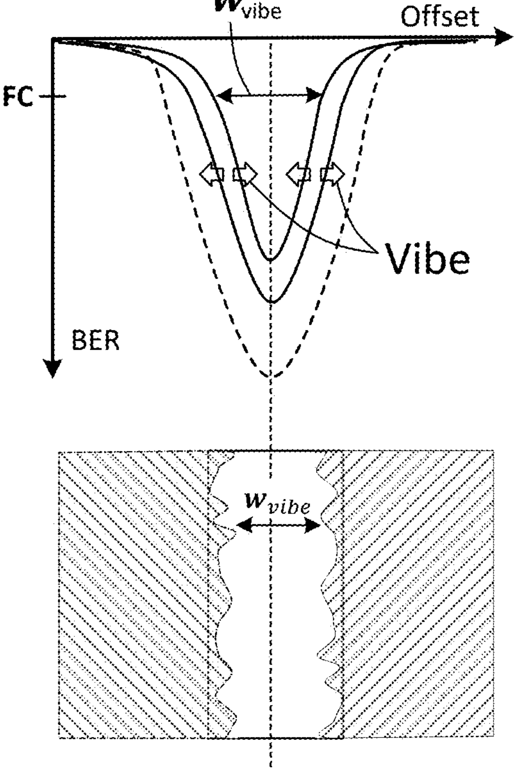

FIGS. 4A-D illustrate the effects that adjacent track squeeze has on the bit error rate (BER) profile width of a data track. The BER profile width, w, may be defined as the range of track offsets under which BER is below a fail criterion, such as a threshold. In FIG. 4A, there is no adjacent track squeeze, and the BER profile width of the Victim track is the full width, $w_{base}$. FIG. 4B indicates the effects of single-sided (SS) squeeze from an adjacent track, denoted Next. As can be seen, the BER profile width of the Victim track is reduced relative to the full width, and denoted $w_{ss}$. FIG. 4C indicates the effects of double-sided (DS) squeeze from an additional adjacent track, denoted Prior. As can be seen, the BER profile width of the Victim track is further reduced relative to the full width, and denoted $w_{DS}$. Finally, FIG. 4D schematically indicates how the effects of vibration events (Vibe) can result in further variability in the adjacent track squeeze, resulting in a BER profile width of the Victim track that can vary both above and below the nominal squeeze amount, and which is denoted $w_{vibe}$. Due to such vibration variation, Vibe may have little effect on the average BER profile width, although it can significantly affect the BER profile width distribution.

Generating a predicted PES for an upcoming sample can be performed in any suitable way. For example, a simple approach may be to use a current sample PES(k−1), or a recent sample PES(k−n), as an approximation of the next sample PES(k). In certain environments, PES(k−1) has shown a correlation to PES(k) of between 45% and 50%. Even at this level of correlation, there is sufficient predictive value such that the current sample or a recent sample can be used as the predictive PES. In another example, a simplified Kalman filtering approach can be used to predict PES. Kalman filtering is a well-known technique that uses a series of measurements observed over time, including statistical noise and other inaccuracies, to estimate a probability distribution over a set of variables for each of a series of time steps. While it is recognized that better predictions may produce fewer false positives and therefore may better maintain in-system performance, it is worth noting that techniques in accordance with the present disclosure are sufficiently robust to allow even naïve predictions to be used and still result in curbing performance losses.

FIG. 5 shows an example of running histograms of actual PES versus predicted PES produced by Kalman filtering using legacy OCLIM write fault techniques. As illustrated, a Kalman prediction approach with legacy OCLIM tends to underpredict the extremes and is therefore not very useful in that context. However, when combined with adjacent track information in accordance with various aspects of techniques of the present disclosure, Kalman filtering can be used to predict track squeeze events. In particular, when using a tightened double-sided limit, 2×t, that is less than 2×OCLIM, track squeeze events can be predicted with fewer false positives, therefore helping to maintain in-system performance by preventing unnecessary write faults.

FIGS. 6A-C illustrate an example of the creation and deletion of a squeeze event record. In FIG. 6A, during writing of data on the Prior track, the PES at sample k goes above the squeeze event threshold (t). As such, a record R is created that includes the PES value. The record may also include a flag for the squeeze type, for example setting a bit for single-sided (SS) or setting another bit for double-sided (DS). In FIG. 6B, during writing of data on the Center track, the Prior track record R is checked. If, as shown in FIG. 6B, the Prior track record R has a positive PES (that is, an encroachment in the direction of the Center track), then the squeeze type is set to SS. Otherwise, if the Prior track record R has a negative PES (that is, an encroachment away from the Center track), then the squeeze type is set at DS. In FIG. 6C, during writing again on the Prior track, the Prior track record R is checked again. If, as shown in FIG. 6C, the squeeze type is SS, then the record R can be cleared on the Prior track. Otherwise, if the squeeze type is DS, then the record R is kept.

Figures 7A, 7B, 7C:
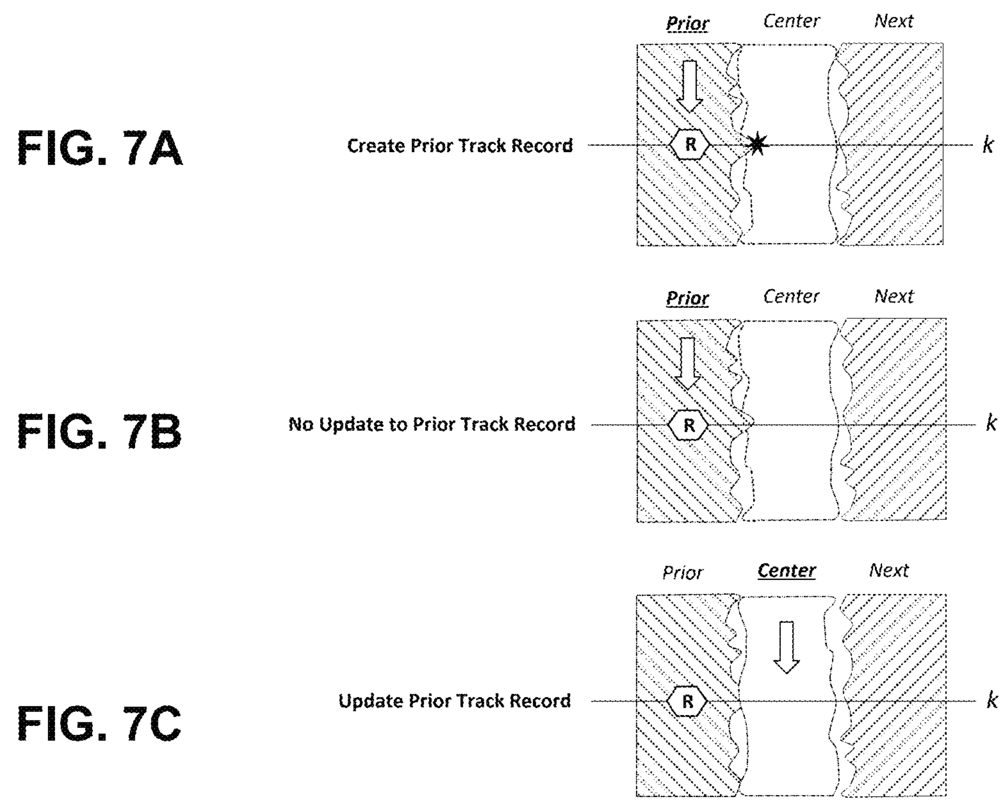
FIGS. 7A-C schematically show a sequence in which an adjacent track squeeze event is recorded, checked, and maintained in accordance with aspects of the present disclosure.

FIGS. 7A-C illustrate an example of the creation and deletion of a squeeze event record. In FIG. 7A, a record R is created that includes the PES value, and the squeeze type is set as DS. In FIG. 7B, during writing of data on the Prior track, the Prior track record R is checked and the squeeze type is kept at DS, and no updating of record R is needed. In FIG. 7C, during writing on the Center track, the Prior track record R is checked again. If, as shown in FIG. 7C, the Prior track record R has a positive PES (that is, an encroachment in the direction of the Center track), then the squeeze type is set to SS and the record R is maintained, even though with the writing of the Center track there is no longer a squeeze risk.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (for example, all described acts or events may not be necessary to carry out the techniques). In addition, while certain aspects of this disclosure are described as being performed by a single module or unit for purposes of clarity, it should be understood that the techniques of this disclosure may be performed by a combination of units or modules.

All scientific and technical terms used herein have meanings commonly used in the art unless otherwise specified. The definitions provided herein are to facilitate understanding of certain terms used frequently herein and are not meant to limit the scope of the present disclosure.

As used herein, the term "configured to" may be used interchangeably with the terms "adapted to" or "structured to" unless the content of this disclosure clearly dictates otherwise.

As used herein, the term "or" refers to an inclusive definition, for example, to mean "and/or" unless its context of usage clearly dictates otherwise. The term "and/or" refers to one or all of the listed elements or a combination of at least two of the listed elements.

As used herein, the phrases "at least one of" and "one or more of" followed by a list of elements refers to one or more of any of the elements listed or any combination of one or more of the elements listed.

As used herein, the terms "coupled" or "connected" refer to at least two elements being attached to each other either directly or indirectly. An indirect coupling may include one or more other elements between the at least two elements being attached. Further, in one or more embodiments, one element "on" another element may be directly or indirectly on and may include intermediate components or layers therebetween. Either term may be modified by "operatively" and "operably," which may be used interchangeably, to describe that the coupling or connection is configured to allow the components to interact to carry out described or otherwise known functionality.

As used herein, any term related to position or orientation, such as "proximal," "distal," "end," "outer," "inner," and the like, refers to a relative position and does not limit the absolute orientation of an embodiment unless its context of usage clearly dictates otherwise.

The singular forms "a," "an," and "the" encompass embodiments having plural referents unless its context clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

What is claimed is:

1. A method for use in a hard disk drive, the hard disk drive having data recorded in sectors arranged in tracks, the method comprising:

measuring and recording a first position error signal that exceeds a squeeze threshold set for detecting adjacent track squeeze events, the first position error signal associated with a first sector on a first track;

while writing data at a second sector on a second track adjacent to the first sector on the first track, generating a predicted position error signal for a next sector on the second track;

comparing a difference between the predicted position error signal and the first position error signal to a squeeze limit;

responsive to comparing the difference to the squeeze limit, writing the next sector on the second track when the difference is not greater than the squeeze limit, otherwise setting a squeeze event flag and preventing writing the next sector until the squeeze event flag is cleared; and preventing data writes when a current position error signal exceeds an on-cylinder limit, the on-cylinder limit being greater than the squeeze threshold.

2. The method of claim 1, wherein generating the predicted position error signal comprises measuring a current position error signal and using the current position error signal as the predicted position error signal.

3. The method of claim 1, wherein generating the predicted position error signal comprises using a previously measured position error signal as the predicted position error signal.

4. The method of claim 1, wherein generating the predicted position error signal comprises using Kalman filtering.

5. The method of claim 1, further comprising determining a velocity of the first position error signal.

6. The method of claim 5, further comprising using the velocity in generating the predicted position error signal.

7. The method of claim 1, further comprising determining for any position error signal that exceeds the squeeze threshold whether that position error signal is associated with a single-sided squeeze event or a double-sided squeeze event.

8. A hard disk drive comprising:

a recording head configured to write data in data tracks on a spinning magnetic recording disk; and controller electronics coupled to the recording head for controlling writing data, the controller electronics configured to:

measure and record a first position error signal that exceeds a squeeze threshold set for detecting adjacent track squeeze events, the first position error signal associated with a first sector on a first track of the spinning magnetic recording disk;

while data is being written at a second sector on a second track adjacent to the first sector on the first track, generate a predicted position error signal for a next sector on the second track;

compare a difference between the predicted position error signal and the first position error signal to a squeeze limit; and responsive to comparing the difference to the squeeze limit, control the recording head to write the next sector on the second track when the difference is not greater than the squeeze limit, and otherwise set a squeeze event flag that prevents writing the next sector until the squeeze event flag is cleared, wherein the controller electronics are further configured to implement a servo control system that prevents data writes when a current position error signal exceeds an on-cylinder limit, the on-cylinder limit being greater than the squeeze threshold.

9. The hard disk drive of claim 8, wherein the predicted position error signal is generated by measuring a current position error signal and using the current position error signal as the predicted position error signal.

10. The hard disk drive of claim 8, wherein the predicted position error signal is generated by using a previously measured position error signal as the predicted position error signal.

11. The hard disk drive of claim 8, wherein the predicted position error signal is generated by using Kalman filtering.

12. The hard disk drive of claim 8, wherein the controller electronics are further configured to determine a velocity of the first position error signal.

13. The hard disk drive of claim 12, wherein the controller electronics are further configured to use the velocity to generate the predicted position error signal.

14. The hard disk drive of claim 8, wherein the controller electronics are further configured to determine for any position error signal that exceeds the squeeze threshold whether that position error signal is associated with a single-sided squeeze event or a double-sided squeeze event.

15. A method for use in a hard disk drive, the hard disk drive having data recorded in sectors arranged in tracks, the method comprising:

measuring and recording a first position error signal that exceeds a squeeze threshold set for detecting adjacent track squeeze events, the first position error signal associated with a first sector on a first track;

while writing data at a second sector on a second track adjacent to the first sector on the first track, generating a predicted position error signal for a next sector on the second track;

comparing a difference between the predicted position error signal and the first position error signal to a squeeze limit;

responsive to comparing the difference to the squeeze limit, writing the next sector on the second track when the difference is not greater than the squeeze limit, otherwise setting a squeeze event flag and preventing writing the next sector until the squeeze event flag is cleared; and determining for any position error signal that exceeds the squeeze threshold whether that position error signal is associated with a single-sided squeeze event or a double-sided squeeze event.

16. The method of claim 15, wherein determining whether the position error signal is associated with the single-sided squeeze event or the double-sided squeeze event comprises comparing a position error signal from a first adjacent track and a position error signal from a second adjacent track.

17. The method of claim 15, wherein the single-sided squeeze event is determined when a squeeze condition is detected with respect to one adjacent track and not with respect to another adjacent track.

18. The method of claim 15, wherein the double-sided squeeze event is determined when a first squeeze condition is detected with respect to a first adjacent track and a second squeeze condition is detected with respect to a second adjacent track.

19. The method of claim 15, further comprising storing an indication of whether the position error signal is associated with the single-sided squeeze event or the double-sided squeeze event.

20. The method of claim 15, further comprising selecting a write control response based on whether the position error signal is associated with the single-sided squeeze event or the double-sided squeeze event.

* * * * *